Patented Mar. 24, 1925.

1,530,665

UNITED STATES PATENT OFFICE.

GEORGE J. HAAS, OF MONROEVILLE, OHIO.

COMPOSITION OF MATTER.

No Drawing.   Application filed August 1, 1923. Serial No. 655,144.

*To all whom it may concern:*

Be it known that I, GEORGE J. HAAS, a citizen of United States, residing at Monroeville, in the county of Huron and State of Ohio, have invented new and useful Improvements in Composition of Matter, of which the following is a specification.

The present invention relates to a composition to be used for soldering or mending various articles, such as granite ware, glassware, chinaware, wooden ware, and iron ware. It can also be used for cementing galvanized iron to glass, and it can be used for preventing sky lights from leaking.

The composition in its preferred form is composed of ground mica mixed with aluminum bronze powder and slaked lime, to which mixture a sufficient amount of varnish mixture, composed for example, of a high grade of floor varnish containing a hard common and durable oil, into which is ground silicate of magnesium, such as talc.

The proportions of the different materials can be varied more or less, but the final product should be in the form of a stiff putty or plastic mass. Especially favorable results have been produced with the following:

|  | Parts. |
|---|---|
| Ground mica | 1 |
| Aluminum bronze | 2 |
| Floor varnish | 4 |
| Talc | 2 |

It is to be understood that the number of parts of these ingredients is here given for purpose of illustration. The material can be used, for example, for mending articles as above referred to, as well as aluminum ware, crockery, iron pipes, steam radiators, roofs, eave troughs, pumps, automobile radiators or jackets of automobile engines.

An appropriate sized piece of the plastic mass will be pressed into the hole or crack, or in case broken articles are to be cemented together, a thin layer of the plastic mass can be spread over the broken surface and the two pieces then forced tight together.

The composition can then be allowed to dry and harden at ordinary temperature, which would require more or less time, say two or three days in many cases, while if it is desired to use the mended article without long delay, the coating of the plastic material, after an application, can be subjected to the heat of a gasoline blow torch until dry.

The slaked lime above referred to, increases the property of the material of withstanding intense heat, this being of great advantage in some instances. This ingredient however can be omitted from the composition if desired.

For patching granite ware, it is not necessary to apply a patch of sheet metal over the hole to be repaired, and I have repaired holes as large as a dime in granite pans, without the use of a metal patch, for reinforcement. In some cases, however, as where very large holes are to be repaired, it is advisable to employ a metal patch.

The composition has been used to repair the crack in an automobile engine which had frozen up and bursted. The composition which is applied over the bursted part, being forced more or less into the crack itself by means of a putty knife after which the same was heated with a gasoline torch for a few minutes to dry the same.

I claim:

1. A plastic composition adapted for stopping up leaks and the like, comprising ground mica, aluminum bronze, varnish and magnesium silicate, in such proportions as to form a thick putty.

2. A composition adapted for stopping up leaks and the like, comprising ground mica, aluminum bronze, varnish, magnesium silicate and slaked lime, in such proportions as to form a soft putty.

In testimony whereof I affix my signature.

GEORGE J. HAAS.